United States Patent
Watson et al.

(10) Patent No.: US 12,335,392 B2
(45) Date of Patent: Jun. 17, 2025

(54) SECURE DATA EXCHANGE MATCHING ACROSS IDENTITY PROVIDERS

(71) Applicant: Visa International Service Association, San Francisco, CA (US)

(72) Inventors: Gaven James Watson, Palo Alto, CA (US); Sunpreet Singh Arora, Union City, CA (US); Srinivasan Raghuraman, Cambridge, MA (US); Kim R. Wagner, Sunnyvale, CA (US); Jason Lightman, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/847,420

(22) PCT Filed: Jun. 12, 2023

(86) PCT No.: PCT/US2023/068304
§ 371 (c)(1),
(2) Date: Sep. 16, 2024

(87) PCT Pub. No.: WO2023/244979
PCT Pub. Date: Dec. 21, 2023

(65) Prior Publication Data
US 2025/0112774 A1 Apr. 3, 2025

Related U.S. Application Data

(60) Provisional application No. 63/352,546, filed on Jun. 15, 2022.

(51) Int. Cl.
*H04L 9/32* (2006.01)
*H04L 9/14* (2006.01)

(52) U.S. Cl.
CPC . *H04L 9/32* (2013.01); *H04L 9/14* (2013.01)

(58) Field of Classification Search
CPC .................................. H04L 9/32; H04L 9/14
See application file for complete search history.

(56) References Cited

U.S. PATENT DOCUMENTS 11,012,245 B1 * 5/2021 Rivlin ................. H04L 63/0428
2018/0254893 A1 9/2018 Saxena et al.
(Continued)

FOREIGN PATENT DOCUMENTS

WO 2022086680 A1 4/2022

OTHER PUBLICATIONS

PCT/US2023/068304, "International Search Report and the Written Opinion", Oct. 13, 2023, 17 pages.

*Primary Examiner* — Abiy Getachew
(74) *Attorney, Agent, or Firm* — Kilpatrick Townsend & Stockton LLP

(57) ABSTRACT

A method includes receiving a first encrypted first identity attribute. A first doubly encrypted first identity attribute is formed by encrypting the first encrypted first identity attribute. A second doubly encrypted first identity attribute is formed by encrypting the first encrypted first identity attribute. They are transmitted to a user device, which removes a user layer of encryption on each to form a second encrypted first identity attribute and a third encrypted first identity attribute. Layers of encryption are added to the second encrypted first identity attribute to form a third doubly encrypted first identity attribute and the third encrypted first identity attribute to form a fourth doubly encrypted first identity attribute. The server computer receives them and transmits, to the second identity provider computer, the fourth doubly encrypted first identity attribute.

(Continued)

The second identity provider computer obtains a first identity attribute and compares it to a second identity attribute.

20 Claims, 5 Drawing Sheets

(56) References Cited

U.S. PATENT DOCUMENTS

| | | |
|---|---|---|
| 2019/0260594 A1 | 8/2019 | Singhal et al. |
| 2024/0039719 A1* | 2/2024 | Arora .................. H04L 9/14 |
| 2024/0427868 A1* | 12/2024 | Batt .................. G06F 21/32 |

* cited by examiner

SECURE DATA EXCHANGE MATCHING ACROSS IDENTITY PROVIDERS

CROSS-REFERENCES TO RELATED APPLICATIONS

This application is a National Stage of International Application No. PCT/US2023/068304 filed Jun. 12, 2023, which claims priority to U.S. Provisional Application No. 63/352,546, filed on Jun. 15, 2022, which are herein incorporated by reference in their entirety.

BACKGROUND

An interaction between a user and a relying party may require the user to provide access to personal data of the user to the relying party before the relying party performs any action for the user. Such personal data can be held by one or more identity providers. The transfer of such personal data is ideally performed in a manner that minimizes disclosure of it to various parties.

It can be problematic if the identity provider that is contacted for the personal data or derivative thereof does not have the necessary data or the relying party (or other party) is unsure of the accuracy of the identity provider's data. For example, a user may wish to purchase an item using credit, and the user's credit score may be relevant information for a relying party. However, an identity provider such as a DMV (department of motor vehicles) may not have this information, but may have other information that may be useful to the relying party.

Embodiments of the disclosure address this problem and other problems individually and collectively.

SUMMARY

One embodiment of the invention includes a method. A method comprising: receiving, by a server computer from a relying party computer, a request for personal data of a user; transmitting, by the server computer to a first identity provider computer, the request for the personal data of the user; receiving, by the server computer from the first identity provider computer, a first encrypted first identity attribute (c1_b), wherein the first encrypted first identity attribute (c1_b) was formed using a first public key associated with the user; forming, by the server computer, a first doubly encrypted first identity attribute (c1_br) by encrypting the first encrypted first identity attribute (c1_b) using a public key associated with a relying party operating the relying party computer; forming, by the server computer, a second doubly encrypted first identity attribute (c1_bi) encrypting the first encrypted first identity attribute (c1_b) using a public key associated with a second identity provider computer; transmitting, by the server computer to a user device, the first doubly encrypted first identity attribute (c1_br) and the second doubly encrypted first identity attribute (c1_bi), wherein the user device removes a user layer of encryption of the first doubly encrypted first identity attribute (c1_br) and the second doubly encrypted first identity attribute (c1_bi) using a first private key associated with the first public key to form a second encrypted first identity attribute (c1_r) and a third encrypted first identity attribute (c1_i) and thereafter adds an additional layer of encryption to the second encrypted first identity attribute (c1_r) using the public key associated with the relying party to form a third doubly encrypted first identity attribute (c1_rr') and adds an additional layer of encryption to the third encrypted first identity attribute (c1_i) using the public key associated with the second identity provider computer to form a fourth doubly encrypted first identity attribute (c1_ii'); receiving, by the server computer from the user device, the third doubly encrypted first identity attribute (c1_rr') and the fourth doubly encrypted first identity attribute (c1_ii'); transmitting, by the server computer to the second identity provider computer, the fourth doubly encrypted first identity attribute (c1_ii'), wherein the second identity provider computer uses a private key associated with the second identity provider computer to obtain a first identity attribute and then compares the first identity attribute (at1) to a second identity attribute (at2); receiving, by the server computer from the second identity provider computer, a first message after the second identity provider computer compares the first identity attribute (at1) to the second identity attribute (at2); and transmitting, by the server computer to the relying party computer, a second message after receiving the first message.

Another embodiment of the invention comprises a server computer comprising: a processor; and a non-transitory computer readable medium comprising instructions executable by the processor to perform operations comprising: receiving, from a relying party computer, a request for personal data of a user; transmitting, to a first identity provider computer, the request for the personal data of the user; receiving, from the first identity provider computer, a first encrypted first identity attribute (c1_b), wherein the first encrypted first identity attribute (c1_b) was formed using a first public key associated with the user; forming a first doubly encrypted first identity attribute (c1_br) by encrypting the first encrypted first identity attribute (c1_b) using a public key associated with a relying party operating the relying party computer; forming a second doubly encrypted first identity attribute (c1_bi) encrypting the first encrypted first identity attribute (c1_b) using a public key associated with a second identity provider computer; transmitting, to a user device, the first doubly encrypted first identity attribute (c1_br) and the second doubly encrypted first identity attribute (c1_bi), wherein the user device removes a user layer of encryption of the first doubly encrypted first identity attribute (c1_br) and the second doubly encrypted first identity attribute (c1_bi) using a first private key associated with the first public key to form a second encrypted first identity attribute (c1_r) and a third encrypted first identity attribute (c1_i) and thereafter adds an additional layer of encryption to the second encrypted first identity attribute (c1_r) using the public key associated with the relying party to form a third doubly encrypted first identity attribute (c1_rr') and adds an additional layer of encryption to the third encrypted first identity attribute (c1_i) using the public key associated with the second identity provider computer to form a fourth doubly encrypted first identity attribute (c1_ii'); receiving, from the user device, the third doubly encrypted first identity attribute (c1_rr') and the fourth doubly encrypted first identity attribute (c1_ii'); transmitting, to the second identity provider computer, the fourth doubly encrypted first identity attribute (c1_ii'), wherein the second identity provider computer uses a private key associated with the second identity provider computer to obtain a first identity attribute and then compares the first identity attribute (at1) to a second identity attribute (at2); receiving, from the second identity provider computer, a first message after the second identity provider computer compares the first identity attribute (at1) to the second identity attribute (at2); and transmitting, to the relying party computer, a second message after receiving the first message.

Yet another embodiment of the invention includes a system comprising the above-described server computer.

A better understanding of the nature and advantages of embodiments of the invention may be gained with reference to the following detailed description and accompanying drawings.

DETAILED DESCRIPTION

Figure 1:
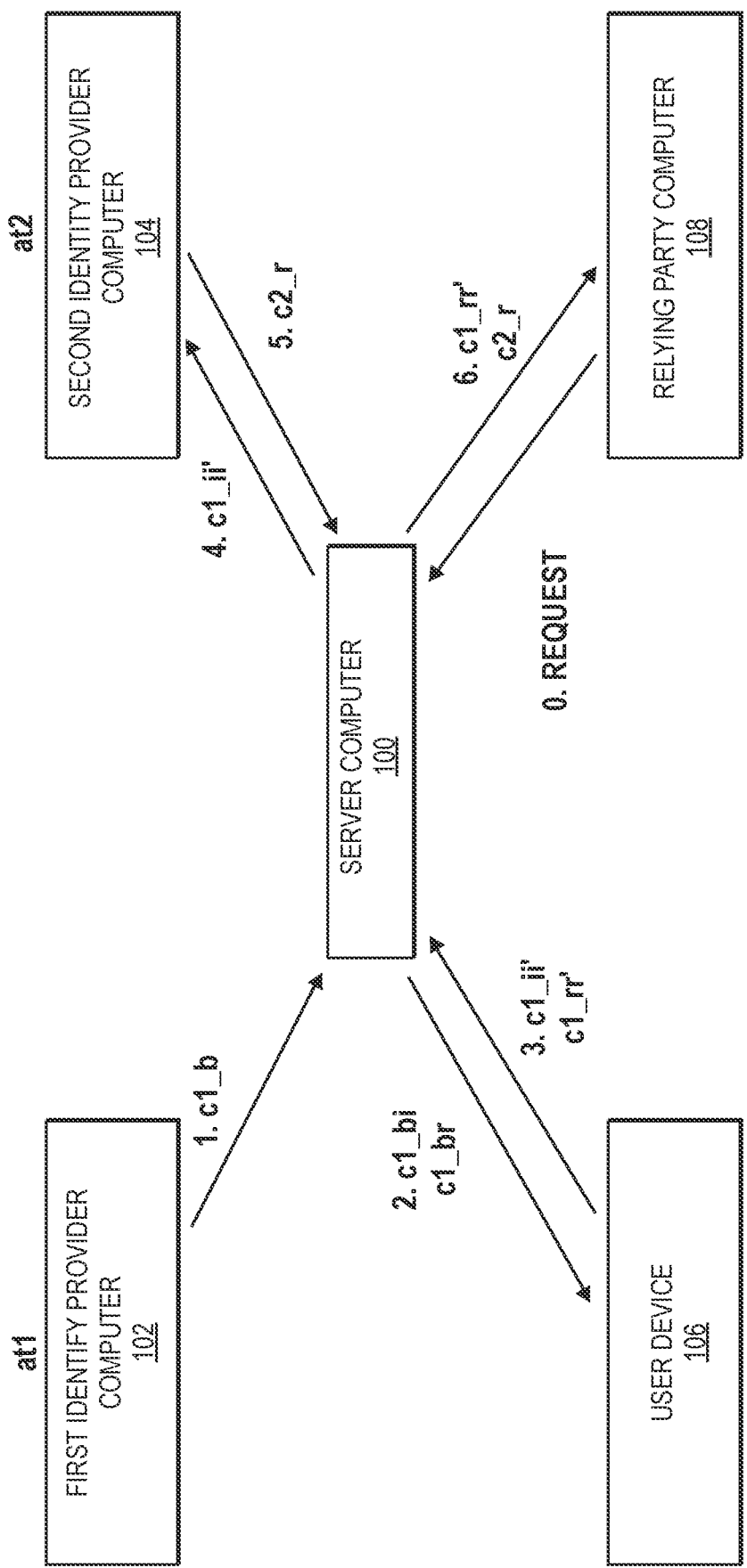
FIG. 1 shows a block diagram of a secure data exchange system and an overlaid flow for secure data exchange method according to embodiments.

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

An "application" may be a computer program that is used for a specific purpose. Examples of applications may include secure data access applications, banking applications, digital wallet applications, event ticketing applications, loyalty rewards applications, etc.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data (e.g., a secure data interaction), a secure webpage (e.g., a secure webpage interaction), a secure location (e.g., a secure location interaction), and the like. In other embodiments, an interaction can include a payment transaction in which two devices can interact to facilitate a payment.

A "relying party" may refer to an entity that may receive identity data in some form (e.g., obscured) and may rely on it to perform some action. For example, a relying party may be a bar that wishes to determine if a user is over twenty-one years old, before the relying party provides alcohol to the user. Other examples of relying parties may include, but are not limited to, merchants, government agencies, transit operators, educational institutions, etc. In some embodiments, a relying party can be a resource provider.

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "identity provider" can be an entity that can maintain data associated with users (e.g., personal data). An exemplary identity provider can include, for example, a governmental agency, a financial institution, a telecommunications provider, or a digital wallet provider. An identity provider can operate an identity provider computer.

"Personal data" may be data that is associated with a specific user. Personal data of a user may provide information of the user or things of the user. Examples of personal data may be the name of the user, the birthdate of the user, contact information (e.g., email addresses, phone numbers, IP addresses, etc.) of the user, the home address of the user, account numbers of accounts associated the user (e.g., bank account numbers, student ID numbers, etc.), etc. In some embodiments, personal data may refer to assertions of raw personal data. For example, personal data may be a data of birth such as Jan. 1, 1970, but an assertion saying "USER IS ABOVE 21 YEARS OLD" may also be referred to as personal data. In some examples, the specific examples of personal data and assertions associated with the specific examples of personal data can be characterized as "identity attributes." Identity attributes can refer to characteristics that can be used to distinguish one user from another user.

A "key" or "cryptographic key" can include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "key pair" may include a pair of linked cryptographic keys. For example, a key pair can include a public key and a corresponding private key (which may also be referred to as a secret key). In a key pair, a first key (e.g., a public key) may be used to encrypt a message, while a second key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public keys and private keys may be in any suitable format, including those based on RSA or elliptic curve cryptography (ECC). In some embodiments, a key pair may be generated using an asymmetric key pair algorithm.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC: IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

FIG. 1 shows a block diagram of a secure data exchange system according to embodiments. The system includes a first identity provider computer 102, a second identity provider computer 104, a user device 106, and a relying computer 108, each in communication with a server computer 100.

The first identity provider computer 102 may be operated by a first identity operator and may hold a first identity attribute at1 of a user operating a user device 106. The second identity provider computer 104 may be operated by a second identity operator and may hold a second identity attribute at2 of the user operating the user device 106. Both the first identity attribute at1 and the second identity attribute at2 may be examples of personal data associated with the user operating the user device 106. The first identity attribute at1 may be in a first set of identity attributes stored by a first identity provider computer and the second identity attribute at2 may be in a second set of identity attributes stored by a second identity provider computer. The first set of identity attributes and the second set of identity attributes may contain overlapping identity attributes. For example, the first set of identity attributes including the first identity attribute at1 may include the name of the user and the home address of the user and the second set of identity attributes including the second identity attribute at2 may include the name of the user, the home address of the user, and the phone number of the user. The user device 106 may have access to an identity application (e.g., by installing the identity application on the user device 106, by accessing a website using the user device 106, etc.) that communicates with a server computer 100 to manage identity attributes of the user operating the user device 106. The user can communicate with the relying party computer 108 operating the user device 106.

The components in the secure data exchange FIG. 1 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); and Secure Hypertext Transfer Protocol (HTTPS).

In the example of FIG. 1, the user device 106, the relying party computer 108, the first identity provider computer 102, and the second identity provider computer 104 can generate cryptographic key pairs (e.g., public-private key pairs) using any suitable asymmetric commutative encryption scheme, such as those discussed in Adi Shamir, et. al., "Mental Poker" in the The Mathematical Gardner., Editor, David A. Klarner, Springer, Boston, MA. (1981) doi: 10.1007/978-1-4684-6686-7_5, or Andre Gustavo Degraf Uchoa, et.al., "A Three-Pass Protocol for Cryptography Based on Padding for Wireless Networks," 2007 $4^{th}$ IEEE Consumer Communications and Networking Conference, 2007, pp. 287-291, doi: 10.1109/CCNC.2007.63, which are herein incorporated by reference in its entirety. A commutative encryption scheme allows the decryption of doubly encrypted data to occur in any order.

The secure data exchange or privacy preserving system of system of FIG. 1 can allow the user to provide identity attributes of personal data to the relying party, or assertions of personal data (e.g., an indication that the user belongs in some group, such as "user is above 21 years old") from more than one identity provider computer. A relying party operating a relying party computer can obtain the personal data from the two different sources and is thus assured that the personal data is accurate. The server computer can advantageously coordinate communications between the identifier provider computers, the user device, and the relying party computer without learning about the user's plaintext personal data.

At step 0, a relying party operating a relying party computer 108 may transmit a public key associated with the relying party and a request to provision personal data of the user to the server computer 100 (e.g., a request to receive the personal data of the user at the relying party computer 108). For example, the relying party computer 108 may transmit a request to provision personal data such as the name of the user, the home address of the user, and the phone number of the user. In embodiments, public keys can be constructed such that they are associative (e.g., for doubly encrypted data, layers of encryption may be removed in any order regardless of the order of encryption).

At step 1, after receiving the request to provision personal data of the user from the relying party computer 108, the server computer 100 may request the first identity attribute at1 from the first identity provider computer 102.

As a response to receiving the request for the first identity attribute at1, the first identity provider computer 102 may encrypt the first identity attribute at1 with a public key associated with the user to form a first encrypted first identity attribute c1_b, and transmit the first encrypted first identity attribute c1_b to the server computer 100. In some embodiments a unique nonce or IV (initialization vector) may be used in the encryption process.

At step 2, after receiving the first encrypted first identity attribute c1_b from the first identity provider computer 102, the server computer 100 may then doubly encrypt the first encrypted first identity attribute c1_b using the public key associated with the relying party to form a first doubly encrypted first identity attribute c1_br. Additionally, the server computer 100 may retrieve a public key associated with the second identity provider to doubly encrypt the first encrypted first identity attribute c1_b using the public key associated with the second identity provider to form a second doubly encrypted first identity attribute c1_bi. The server computer 100 may then transmit the first doubly encrypted first identity attribute c1_br, the second doubly encrypted first identity attribute c1_bi, and optionally the public key associated with the relying party and the public key associated with the second identity provider to the user device 106.

At step 3, after receiving the first doubly encrypted first identity attribute c1_br and the second doubly encrypted first identity attribute c1_bi from the server computer 100, the user device 106 may then use a private key associated with the user to remove a user layer of encryption from both the first doubly encrypted first identity attribute c1_br and the second doubly encrypted first identity attribute c1_bi. The resultant decryption can be a second encrypted first identity attribute c1_r (having a relying party layer of encryption) and a third encrypted first identity attribute c1_i (having a second identity provider layer of encryption). The user device 106 may then add an additional layer of encryption to the second encrypted first identity attribute c1_r using the public key associated with the relying party to form a third doubly encrypted first identity attribute c1_rr'. Additionally, the user device 106 may then add an additional layer of encryption to the third encrypted first identity attribute c1_i using the public key associated with the second identity provider to form a fourth doubly encrypted first identity attribute c1_ii'. The user device 106 may then transmit the third doubly encrypted first identity attribute c1_rr' and the fourth doubly encrypted first identity attribute c1_ii' to the server computer 100.

At step 4, after receiving the third doubly encrypted first identity attribute c1_rr' and the fourth doubly encrypted first identity attribute c1_ii' from the user device 106, the server computer may then transmit the fourth doubly encrypted first identity attribute c1_ii' and optionally the public key associated with the relying party to the second identity provider computer 104.

At step 5, after receiving the fourth doubly encrypted first identity attribute c1_ii', the second identity provider computer 104 may use a private key associated with the second identity provider to remove both second identity provider layers of encryption from the fourth doubly encrypted first identity attribute c1_ii' to retrieve the first identity attribute at1. After retrieving the first identity attribute at1, the second identity provider computer 104 may compare the first identity attribute at1 to a second identity attribute at2. For example, the second identity provider computer 104 may compare and verify the name of the user and the address of the user are the same in the first identity attribute at1 and the second identity attribute at2. After verifying the first identity attribute at1 is similar to the second identity attribute at2, the second identity provider computer 104 may encrypt the second identity attribute at2 using the public key associated with the relying party to form an encrypted second identity attribute c2_r. The second identity provider computer 104 may then transmit the encrypted second identity attribute c2_r to the server computer 100 in a first message.

In other embodiments, the second identity attribute at2 may instead be encrypted using the public key associated with the user. In such embodiments, a process similar to steps 1-3 may be repeated, using the second identity attribute at2 encrypted with the public key of the user (e.g., c2_b) instead of the first encrypted first identity attribute c1_b.

At step 6, after receiving the encrypted second identity attribute c2_r from the second identity provider computer 104, the server computer 100 may transmit the third doubly encrypted first identity attribute c1_rr' and the encrypted second identity attribute c2_r to the relying party computer 108 in a second message.

After receiving the third doubly encrypted first identity attribute c1_rr' and the encrypted second identity attribute c2_r from the server computer 100, the relying party computer 108 may use a private key associated with the relying party to decrypt the third doubly encrypted first identity attribute c1_rr' and the encrypted second identity attribute c2_r to retrieve the first identity attribute at1 and the second identity attribute at2. Once the relying party computer 108 is in possession of the plaintext first identity attribute c1 and the plaintext second identity attribute c2, it can make a decision as to whether or not to provide a resource to the user of the user device 106.

Other embodiments are also possible. For example, instead of sending the encrypted second attribute c2_r in step 5 after step 4, in other embodiments, an encrypted third attribute c3_r, which is different than the encrypted second attribute c2_r can be sent from the second identity provider computer 104 to the server computer 100 and then to the relying party computer 108 in step 6. For example, the first attribute c1 could be the user's phone number that is stored by the first identity provider computer 102, the second attribute c2 could also be the user's phone number stored by the second identity provider computer 102, and the third attribute c3 could be an address of the user stored by the second identity provider computer 104. After the second identity provider computer 104 determines that the first and second attributes c1 and c2 (e.g., two phone numbers) match, then the additional third attribute c3 in encrypted form could be sent to the server computer 100 in a first message, and then to the relying party computer 108 in the second message. Thus, in this embodiment, the relying party computer 108 can receive attributes for a transaction from different identity provider computers in a secure manner. For example, the first identity attribute may be a phone number of the user and the third identity attribute may be an address of the user, and both of these identity attributes may be necessary for the user to complete a transaction.

In another embodiment, after comparing the first and second identity attributes c1 and c2, the second identity provider computer 104 after step 4, the second identity provider computer 104 can generate a match score (e.g., match or no match). The second identity provider computer 104 can transmit the match score to the server computer 100 in the first message. The server computer 100 can transmit the match score to the relying party computer 108 in the second message. After the relying party receives the match score, it can make a decision as to whether or not to provide a requested resource to the user. The match score can indicate that one or more attributes of the user held at two different identity provider computers are the same and that the attributes are verified. In yet another embodiment, this step could be performed encrypted. So, for example, the score is encrypted by the second identity provider under relying party's key, and then transmitted to the server computer. The server computer then transmits it to the relying party which can decrypt to ascertain the plaintext score.

The example in FIG. 1 is provided for ease of illustration and other embodiments are contemplated. For example, although the encryption and transmission of two attributes are described, any number of attributes can be encrypted or transmitted in embodiments of the invention. Further, although two identity provider computers, one relying party computer, and one user device are shown, any number of identity provider computers, relying party computers, and user devices can be present in embodiments of the invention.

Figure 2:
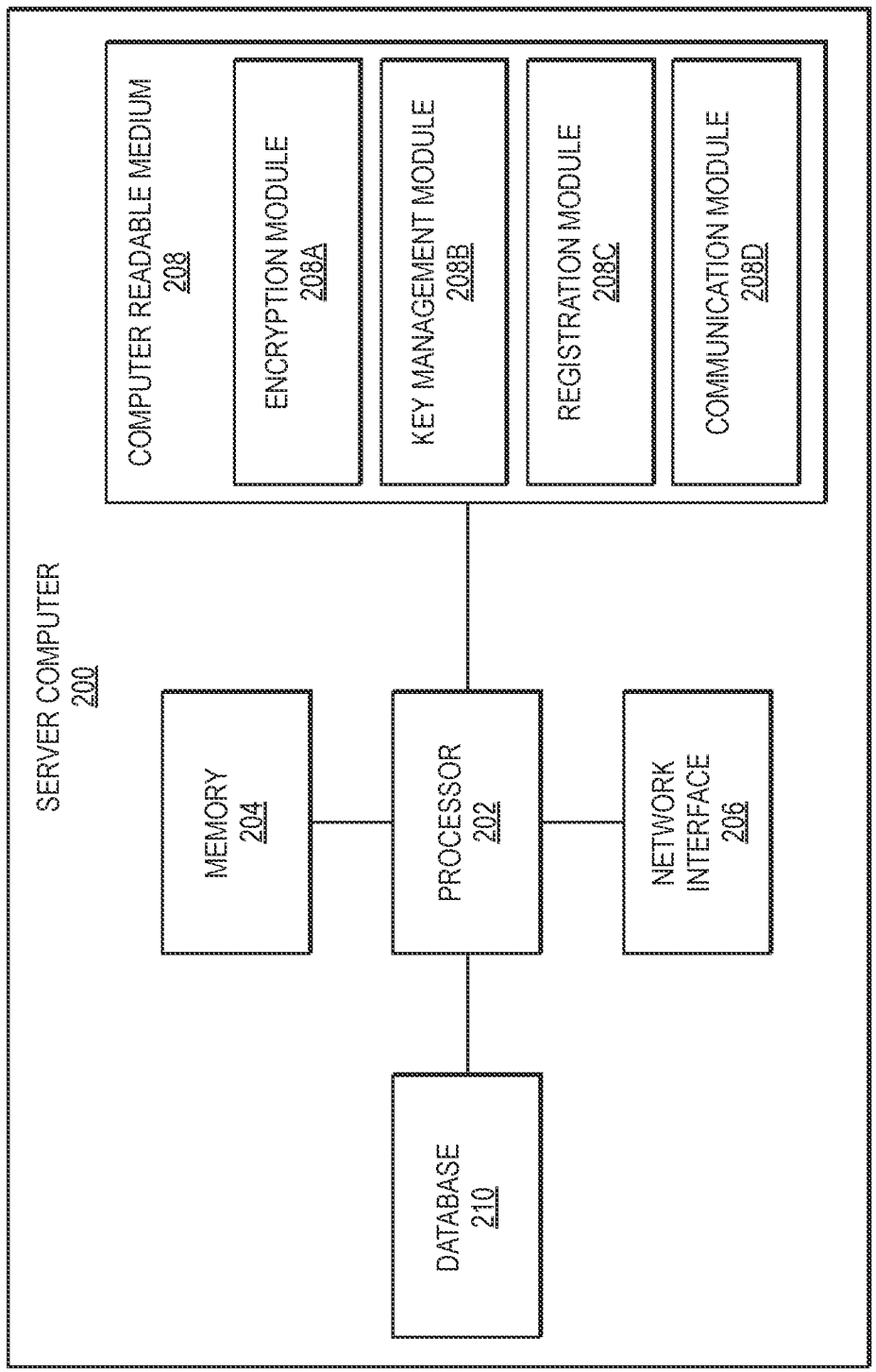
FIG. 2 shows a block diagram of a server computer according to an embodiment.

FIG. 2 shows a block diagram of a server computer 200 according to an embodiment. The server computer 200 may be operated by a processing network such as a payment processing network in some embodiments. The server computer 200 can also comprise a processor 202. The processor 202 may be coupled to a memory 204, a network interface 206, a computer readable medium 208, and a database 210. The computer readable medium 208 may comprise any suitable number and types of software modules.

The encryption module 208A may comprise code that causes the processor 202 to perform cryptographic operations such as encrypting and decrypting data, signing data and verifying signed data, cryptographic key generation, etc. The encryption module 208A and the processor 202 may generate a cryptographic key or cryptographic key pair, and use cryptographic keys to encrypt and decrypt data. For example, the encryption module 208A and the processor 202 may encrypt or re-encrypt using cryptographic keys (e.g., public keys) from various entities including user devices, identity providers, and relying parties.

The key management module 208B may comprise code that causes the processor 202 to manage encryption keys. For example, the key management module 208B may allow the server computer 200 to store cryptographic keys (e.g., public keys) from various entities including user devices, identity providers, and relying parties in the database 210. The key management module 208B and the processor 202 can store retrieve cryptographic keys from the database 210 and provide them to the encryption module 208A to perform the functions described herein.

The registration module 208C and the processor 202 can register the various entities in the system including the users of the user devices, the identity providers operating the identity provider computers, and the relying parties operating the relying party computers.

The communication module 208D and the processor 202 can coordinate communications between the various identity provider computers, user devices, and relying party computers that communicate. The communication module 208D and the processor 202 can use a routing table stored in the database. The routing table may include entries with the addresses for each of the computers and devices in communication with the server computer 200. The routing table may also store data associated with the computers and devices. The data may include cryptographic keys (e.g., public keys) associated with the computers and devices, user permissions associated with the computers and devices (e.g., user permissions to communicate with certain identity provider computers.

The computer readable medium 208 can also comprise code, executable by the processor 202 to perform operations comprising: receiving, from a relying party computer, a request for personal data of a user; transmitting, to a first identity provider computer, the request for the personal data of the user; receiving, from the first identity provider computer, a first encrypted first identity attribute (c1_b), wherein the first encrypted first identity attribute (c1_b) was formed using a first public key associated with the user; forming a first doubly encrypted first identity attribute (c1_br) by encrypting the first encrypted first identity attribute (c1_b) using a public key associated with a relying party operating the relying party computer; forming a second doubly encrypted first identity attribute (c1_bi) encrypting the first encrypted first identity attribute (c1_b) using a public key associated with a second identity provider computer; transmitting, to a user device, the first doubly encrypted first identity attribute (c1_br) and the second doubly encrypted first identity attribute (c1_bi), wherein the user device removes a user layer of encryption of the first doubly encrypted first identity attribute (c1_br) and the second doubly encrypted first identity attribute (c1_bi) using a first private key associated with the first public key to form a second encrypted first identity attribute (c1_r) and a third encrypted first identity attribute (c1_i) and thereafter adds an additional layer of encryption to the second encrypted first identity attribute (c1_r) using the public key associated with the relying party to form a third doubly encrypted first identity attribute (c1_rr') and adds an additional layer of encryption to the third encrypted first identity attribute (c1_i) using the public key associated with the second identity provider computer to form a fourth doubly encrypted first identity attribute (c1_ii'); receiving, from the user device, the third doubly encrypted first identity attribute (c1_rr') and the fourth doubly encrypted first identity attribute (c1_ii'); transmitting, to the second identity provider computer, the fourth doubly encrypted first identity attribute (c1_ii'), wherein the second identity provider computer uses a private key associated with the second identity provider computer to obtain a first identity attribute and then compares the first identity attribute (at1) to a second identity attribute (at2); receiving, from the second identity provider computer, a first message after the second identity provider computer compares the first identity attribute (at1) to the second identity attribute (at2); and transmitting, to the relying party computer, a second message after receiving the first message.

The network interface 1006 may include an interface that can allow the identity provider computer 1000 to communicate with external computers. The network interface 1006 may enable the identity provider computer 1000 to communicate data to and from another device such as a user device, relying party computer, identity provider computer, acquirer computer, key management computer, etc. Some examples of the network interface 1006 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 1006 may include Wi-Fi™. Data transferred via the network interface 1006 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 1006 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
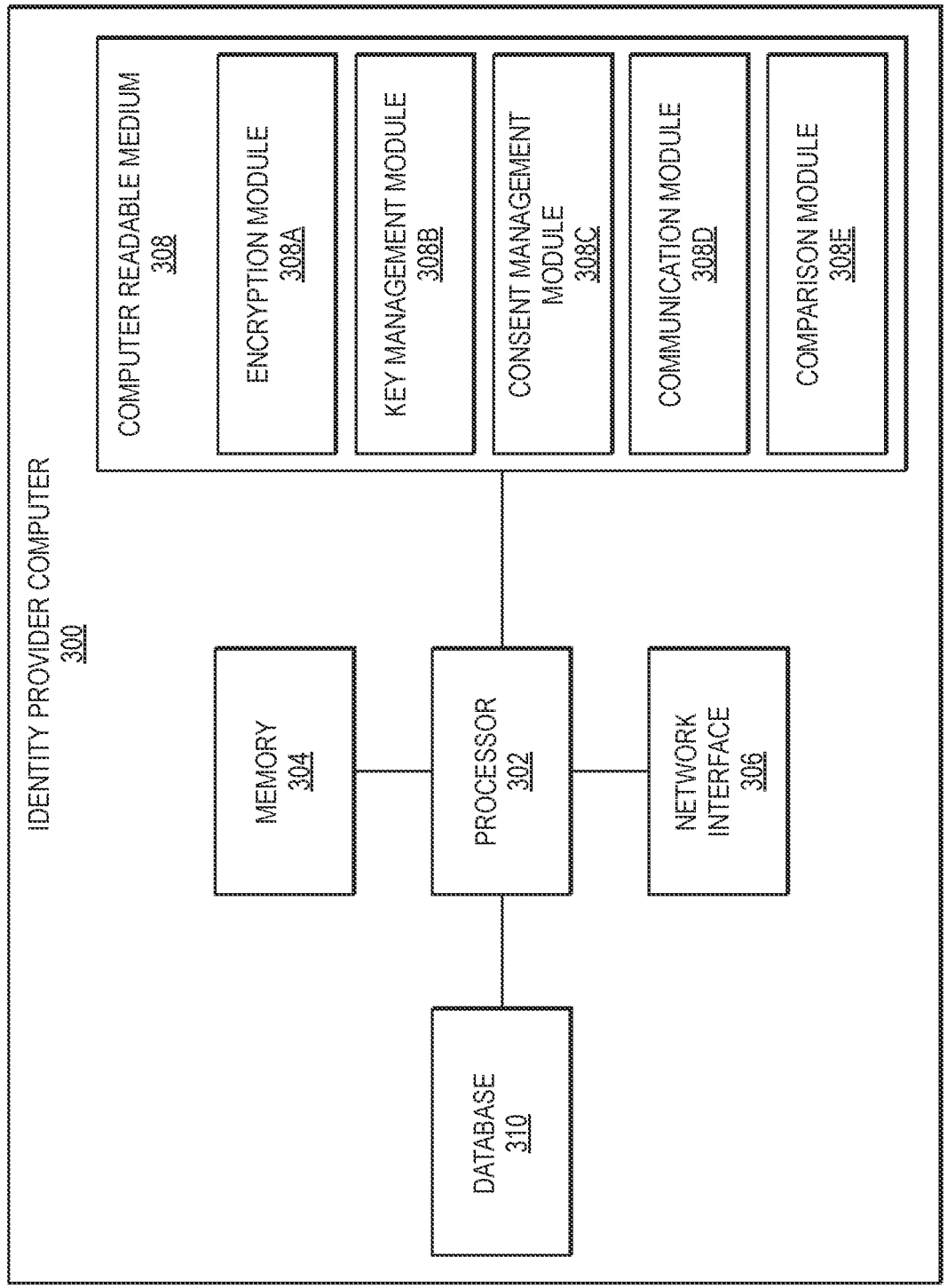
FIG. 3 shows a block diagram of an identity provider computer according to an embodiment.

FIG. 3 shows a block diagram of an identity provider computer 300 according to embodiments. The identity provider computer 300 may be operated by an identity provider that can hold identity attributes of users. Examples of identity providers can include governmental institutions, financial institutions, digital wallets, etc. The identity provider computer 300 may comprise a processor 302. The processor 302 may be coupled to a memory 304, a network interface 306, a computer readable medium 308, and a database 310. The computer readable medium 308 may comprise any suitable number and types of software modules.

The memory 304 may be used to store data and code. The memory 304 may be coupled to the processor 302 internally or externally (e.g., via cloud based data storage), and may comprise any combination of volatile and/or non-volatile memory such as RAM, DRAM, ROM, flash, or any other suitable memory device. The database 310 may be similar to the memory 204, and may store ciphertexts such as encrypted personal data associated with a user.

The computer readable medium 308 may comprise a number of software modules including, but not limited to, an encryption module 308A, a key management module 308B, a consent management module 308C, and a communication module 308D.

The encryption module 308A may comprise code that causes the processor 302 to perform functions that are similar to the above described encryption module 208A, and the descriptions are incorporated herein.

The key management module 308B may comprise code that causes the processor 302 to perform functions that are similar to the above described key management module 208B, and the descriptions are incorporated herein.

The consent management module 308C may comprise code that causes the processor 302 to generate, modify, and delete consents for users. For example, the consent management module 308C and the processor 302 may generate a consent request for a user to respond to. The consent management module 308C may then generate access tokens that indicate the level of consent, and length of time that the user consents to. The consent management module 308C and the processor 302 may also receive revoke requests from user devices, and modify consents according to the revoke request.

The communication module 308D may comprise code that causes the processor 302 to generate messages, forward messages, receive message, reformat messages, and/or otherwise communicate with other entities. In some embodiments, the communication module 308D may facilitate messages being transmitted to and from a user device, a relying party computer, a server computer, etc.

Figure 4:
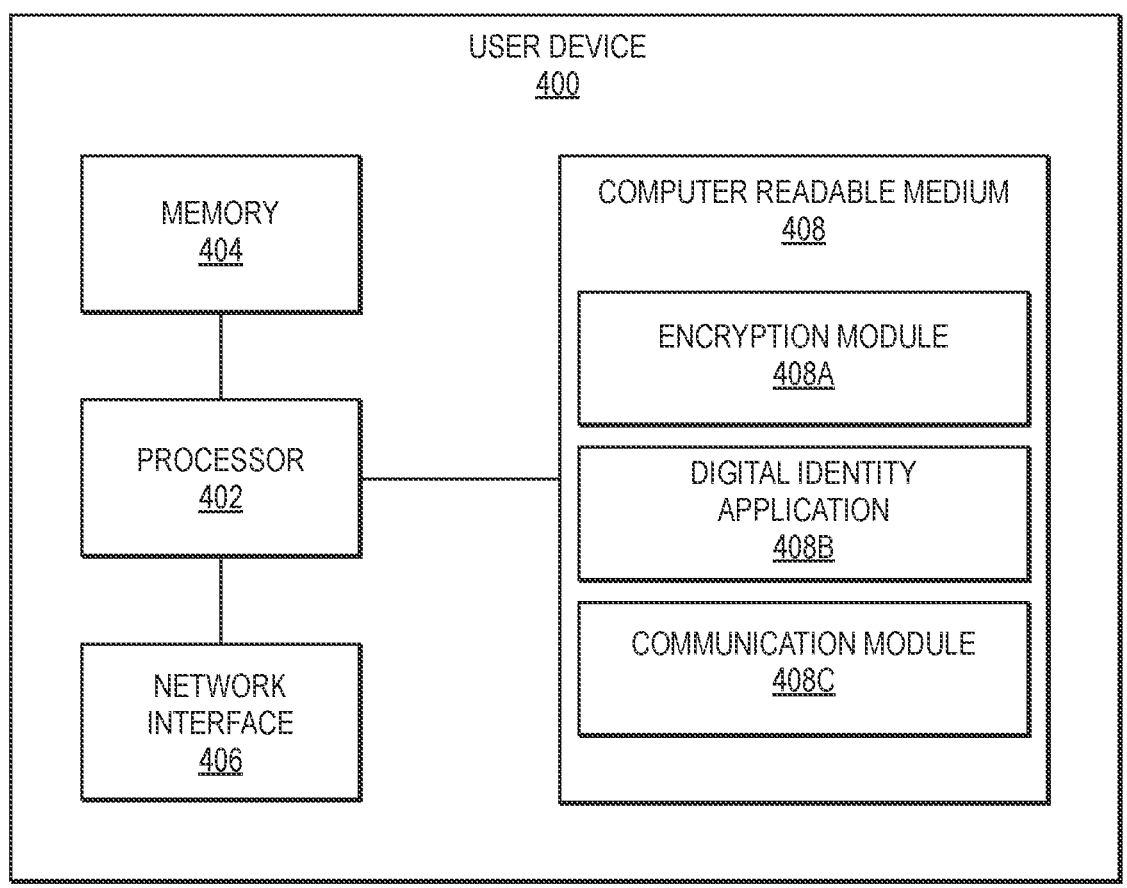
FIG. 4 shows a block diagram of an exemplary user device according to an embodiment.

FIG. 4 shows a block diagram of a user device 400 according to embodiments. The user device 400 may be operated by a user. The user device 400 may comprise a processor 402. The processor 402 may be coupled to a memory 404, a network interface 406, and a computer readable medium 408. The computer readable medium 408 may comprise any suitable number and types of software modules.

The memory 404 and network interface 406 may have the same or different features to the previously described memory 204 and network interface 206 and the descriptions thereof are incorporated herein.

The computer readable medium 1108 may comprise a number of software modules including, but not limited to, an encryption module 408A, a digital identity application 408B, and a communication module 408C.

The encryption module 408A may comprise code that causes the processor 402 to perform encryptions and decryptions of data. The encryption module 408A may comprise code that causes the processor 402 to perform functions that are similar to the above described encryption module 208A, and the descriptions are incorporated herein.

The digital identity application 408B may comprise code that causes the processor 402 to maintain a digital identity account. The digital identity application 408B may store personal data associated with the user operating the user device 400. The digital identity application 408B may allow the user device 400 to communicate with the server computer. The digital identity application 408B may additionally allow the user to manage consents related to the digital identity account. For example, if the user device 400 transmitted personal data stored by the digital identity application 408B and provided consent to a relying party to access the personal data, the digital identity application 408B may be used to modify the consent.

The communication module 400C may have the same or different features to the previously described communication module 208D.

Figure 5:
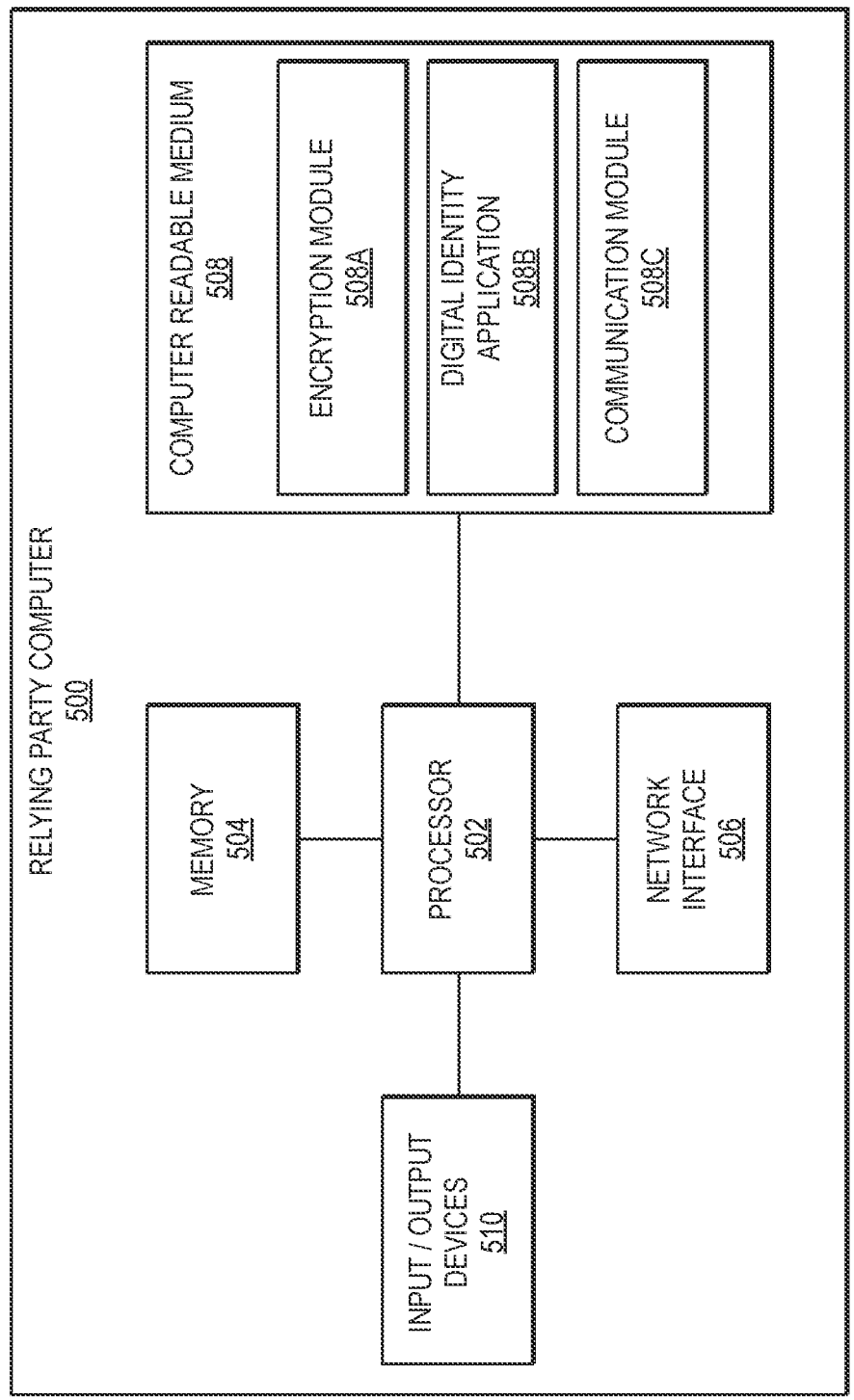
FIG. 5 shows a block diagram of a relying party computer according to an embodiment.

FIG. 5 shows a block diagram of a relying party computer 500 according to an embodiment. The relaying party computer 500 may be operated by a user. The relying party computer 500 may comprise a processor 502. The processor 502 may be coupled to a memory 504, a network interface 506, input/output devices 510, and a computer readable medium 508. The input/output devices 501 can include touchscreens, keyboards, speakers, displays, microphones and any other device that is suitable to provide outputs or receive inputs. The computer readable medium 508 may comprise any suitable number and types of software modules.

The memory 504 and network interface 506 may have the same or different features to the previously described memory 204 and network interface 206 and the descriptions thereof are incorporated herein.

The computer readable medium 508 may comprise a number of software modules including, but not limited to, an encryption module 508A, a digital identity application 508B, and a communication module 508C. The encryption module 508A, the digital identity application 508B, and the communication module 508C can be programmed to have similar or different functions than the encryption module 408A, the digital identity application 408B, and the communication module 408C in the user device 400 in FIG. 4.

Embodiments of the invention have a number of advantages. Embodiments of the invention can protect a user's personal data in a distributed network while confirming its accuracy with different identity service providers. Further, a relying party can obtain user attributes from multiple, remote and distributed identity provider computers in a secure manner without exposing plaintext identity attributes.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a server computer from a relying party computer, a request for personal data of a user;
   transmitting, by the server computer to a first identity provider computer, the request for the personal data of the user;
   receiving, by the server computer from the first identity provider computer, a first encrypted first identity attribute, wherein the first encrypted first identity attribute was formed using a first public key associated with the user;
   forming, by the server computer, a first doubly encrypted first identity attribute by encrypting the first encrypted first identity attribute using a public key associated with a relying party operating the relying party computer;
   forming, by the server computer, a second doubly encrypted first identity attribute encrypting the first encrypted first identity attribute using a public key associated with a second identity provider computer;
   transmitting, by the server computer to a user device, the first doubly encrypted first identity attribute and the second doubly encrypted first identity attribute, wherein the user device removes a user layer of encryption of the first doubly encrypted first identity attribute and the second doubly encrypted first identity attribute using a first private key associated with the first public key to form a second encrypted first identity attribute and a third encrypted first identity attribute and thereafter adds an additional layer of encryption to the second encrypted first identity attribute using the public key associated with the relying party to form a third doubly encrypted first identity attribute and adds an additional layer of encryption to the third encrypted first identity attribute using the public key associated with the second identity provider computer to form a fourth doubly encrypted first identity attribute;
   receiving, by the server computer from the user device, the third doubly encrypted first identity attribute and the fourth doubly encrypted first identity attribute;
   transmitting, by the server computer to the second identity provider computer, the fourth doubly encrypted first identity attribute, wherein the second identity provider computer uses a private key associated with the second identity provider computer to obtain a first identity attribute and then compares the first identity attribute to a second identity attribute;
   receiving, by the server computer from the second identity provider computer, a first message after the second identity provider computer compares the first identity attribute to the second identity attribute; and
   transmitting, by the server computer to the relying party computer, a second message after receiving the first message.

2. The method of claim 1, wherein after the second identity provider computer compares the first identity attribute to the second identity attribute, the second identity provider computer encrypts the second identity attribute using the public key associated with the relying party to form an encrypted second identity attribute,
   wherein the first message comprises the encrypted second identity attribute, and
   wherein the second message comprises the third doubly encrypted first identity attribute and the encrypted second identity attribute, wherein the relying party computer uses a private key associated with the relying party to obtain the first identity attribute and the second identity attribute.

3. The method of claim 2, wherein the relying party computer determines that the first identity attribute matches the second identity attribute, and then provides a resource to the user.

4. The method of claim 2, wherein the personal data comprises one or more of a name of the user, a birthdate of the user, contact information of the user, a home address of the user, and/or account numbers of accounts associated the user.

5. The method of claim 2, wherein the first message comprises an encrypted third attribute formed by encrypting a third identity attribute with a relying party public key, and the second message comprises message comprises the third doubly encrypted first identity attribute and the encrypted third identity attribute, wherein the encrypted third identity attribute and the third doubly encrypted first identity attribute are decrypted by the relying party computer using a relying party private key to obtain the first identity attribute and the third identity attribute, and decides whether to provide a resource to the user based upon the first identity attribute and the second identity attribute.

6. The method of claim 2, wherein the first identity provider computer is operated by a first identity provider and the second identity provider computer is associated with a second identity provider, the first and second identity providers being different, and each being on selected from a group consisting of: a governmental agency, a financial institution, a telecommunications provider, and a digital wallet provider.

7. The method claim 6, wherein the first identity provider computer stores a first set of identity attributes of the user including the first identity attribute, and the second identity provider computer stores a second set of identity attributes of the user including the second identity attribute, the first set of identity attributes of the user having a different number of identity attributes than the second set of identity attributes of the user.

8. The method of claim 1, wherein the second identity provider computer generates a match score after comparing the first identity attribute to the second identity attribute, and wherein the first message comprises the match score, and the second message also comprises the match score.

9. The method of claim 8, wherein the relying party uses the match score to determine if a resource can be provided to the user.

10. The method of claim 1, wherein the server computer is remotely located with respect to the user device, the relying party computer, the first identity provider computer, and the second identity provider computer.

11. A server computer comprising:
a processor; and
a non-transitory computer readable medium comprising instructions executable by the processor to perform operations comprising:
receiving, from a relying party computer, a request for personal data of a user;
transmitting, to a first identity provider computer, the request for the personal data of the user;
receiving, from the first identity provider computer, a first encrypted first identity attribute, wherein the first encrypted first identity attribute was formed using a first public key associated with the user;
forming a first doubly encrypted first identity attribute by encrypting the first encrypted first identity attribute using a public key associated with a relying party operating the relying party computer;
forming a second doubly encrypted first identity attribute encrypting the first encrypted first identity attribute using a public key associated with a second identity provider computer;
transmitting, to a user device, the first doubly encrypted first identity attribute and the second doubly encrypted first identity attribute, wherein the user device removes a user layer of encryption of the first doubly encrypted first identity attribute and the second doubly encrypted first identity attribute using a first private key associated with the first public key to form a second encrypted first identity attribute and a third encrypted first identity attribute and thereafter adds an additional layer of encryption to the second encrypted first identity attribute using the public key associated with the relying party to form a third doubly encrypted first identity attribute and adds an additional layer of encryption to the third encrypted first identity attribute using the public key associated with the second identity provider computer to form a fourth doubly encrypted first identity attribute;
receiving, from the user device, the third doubly encrypted first identity attribute and the fourth doubly encrypted first identity attribute;
transmitting, to the second identity provider computer, the fourth doubly encrypted first identity attribute, wherein the second identity provider computer uses a private key associated with the second identity provider computer to obtain a first identity attribute and then compares the first identity attribute to a second identity attribute;
receiving, from the second identity provider computer, a first message after the second identity provider computer compares the first identity attribute to the second identity attribute; and
transmitting, to the relying party computer, a second message after receiving the first message.

12. The server computer of claim 11, wherein the operations further comprise:
after the second identity provider computer compares the first identity attribute to the second identity attribute, the second identity provider computer encrypts the second identity attribute using the public key associated with the relying party to form an encrypted second identity attribute,
wherein the first message comprises the encrypted second identity attribute, and
wherein the second message comprises the third doubly encrypted first identity attribute and the encrypted second identity attribute, wherein the relying party computer uses a private key associated with the relying party to obtain the first identity attribute and the second identity attribute.

13. A system comprising:
a server computer comprising;
a processor; and
a non-transitory computer readable medium comprising instructions executable by the processor to perform operations comprising
receiving, from a relying party computer, a request for personal data of a user,
transmitting, to a first identity provider computer, the request for the personal data of the user,
receiving, from the first identity provider computer, a first encrypted first identity attribute, wherein the first encrypted first identity attribute was formed using a first public key associated with the user,
forming a first doubly encrypted first identity attribute by encrypting the first encrypted first identity attribute using a public key associated with a relying party operating the relying party computer,
forming a second doubly encrypted first identity attribute encrypting the first encrypted first identity attribute using a public key associated with a second identity provider computer,
transmitting, to a user device, the first doubly encrypted first identity attribute and the second doubly encrypted first identity attribute, wherein the user device removes a user layer of encryption of the first doubly encrypted first identity attribute and the second doubly encrypted first identity attribute using a first private key associated with the first public key to form a second encrypted first identity attribute and a third encrypted first identity attribute and thereafter adds an additional layer of encryption to the second encrypted first identity attribute using the public key associated with the relying party to form a third doubly encrypted first identity attribute and adds an additional layer of encryption to the third encrypted first identity attribute using the public key associated with the second identity provider computer to form a fourth doubly encrypted first identity attribute,
receiving, from the user device, the third doubly encrypted first identity attribute and the fourth doubly encrypted first identity attribute,
transmitting, to the second identity provider computer, the fourth doubly encrypted first identity attribute, wherein the second identity provider computer uses a private key associated with the second identity provider computer to obtain a first identity attribute and then compares the first identity attribute to a second identity attribute, receiving, from the second identity provider computer, a first message after the second identity provider computer compares the first identity attribute to the second identity attribute; and transmitting, to the relying party computer, a second message after receiving the first message.

14. The system of claim 13, wherein the operations further comprise:

wherein after the second identity provider computer compares the first identity attribute to the second identity attribute, the second identity provider computer encrypts the second identity attribute using the public key associated with the relying party to form an encrypted second identity attribute, wherein the first message comprises the encrypted second identity attribute, and wherein the second message comprises the third doubly encrypted first identity attribute and the encrypted second identity attribute, wherein the relying party computer uses a private key associated with the relying party to obtain the first identity attribute and the second identity attribute.

15. The system of claim 13, further comprising:
the user device in communication with the server computer.

16. The system of claim 14, further comprising:
the relying party computer in communication with the server computer.

17. The system of claim 15, further comprising:
the first identity provider computer in communication with the server computer.

18. The system of claim 16, further comprising:
the second identity provider computer in communication with the server computer.

19. The system of claim 13, wherein the server computer, the relying party computer, the user device, the first identity provider computer, and the second identity provider computer are remotely located with respect to each other.

20. The system of claim 13, The system of claim 13, wherein the first and second identity attributes comprise one or more of a name of the user, a birthdate of the user, contact information of the user, a home address of the user, and/or account numbers of accounts associated the user.

* * * * *